United States Patent [19]

Kondo et al.

[11] Patent Number: 5,672,285
[45] Date of Patent: Sep. 30, 1997

[54] LASER CASTING APPARATUS AND METHOD

[75] Inventors: Masaki Kondo; Shigeki Maekawa, both of Moriguchi, Japan

[73] Assignee: Matsushita Electric Industrial Co., Ltd., Osaka, Japan

[21] Appl. No.: 385,675

[22] Filed: Feb. 8, 1995

[30] Foreign Application Priority Data

Feb. 9, 1994 [JP] Japan ..................... 6-15230

[51] Int. Cl.$^6$ ................................. B23K 26/06
[52] U.S. Cl. .................. 219/121.78; 219/121.73; 219/121.77; 362/259
[58] Field of Search .......... 219/121.73, 121.75, 219/121.78, 121.77; 359/559, 710, 11; 362/259

[56] References Cited

U.S. PATENT DOCUMENTS

| | | | |
|---|---|---|---|
| 3,705,758 | 12/1972 | Haskal | 219/121.75 |
| 4,013,338 | 3/1977 | Sato et al. | 359/559 |
| 4,370,026 | 1/1983 | Durboeueq et al. | 362/259 |
| 4,733,944 | 3/1988 | Fahlen et al. | 359/710 |
| 4,744,615 | 5/1988 | Fan et al. | 219/121.77 |
| 4,985,780 | 1/1991 | Garnier et al. | 219/121.78 |
| 5,016,149 | 5/1991 | Tanaka et al. | 362/259 |
| 5,068,515 | 11/1991 | van den Bergh et al. | 219/121.75 |
| 5,331,466 | 7/1994 | Van Saarloos | 359/710 |
| 5,406,042 | 4/1995 | Engelfriet et al. | 219/121.75 |
| 5,479,238 | 12/1995 | Whitney | 359/11 |

FOREIGN PATENT DOCUMENTS 4237588  8/1992  Japan .

Primary Examiner—Geoffrey S. Evans
Attorney, Agent, or Firm—Wenderoth, Lind & Ponack

[57] ABSTRACT

A laser casting apparatus includes a laser light source, a phase disturbing device for disturbing a phase of laser light output from the laser light source, and a beam forming device for forming a beam of a predetermined shape. The formed beam is cast on a work after decomposing the laser light in to beams each having a small area and then superposing the decomposed beams. The phase disturbing device disturbs the phase of the light in a manner so that the superimposed beam formed of the decomposed beams has a uniform energy distribution without interference fringes.

20 Claims, 2 Drawing Sheets

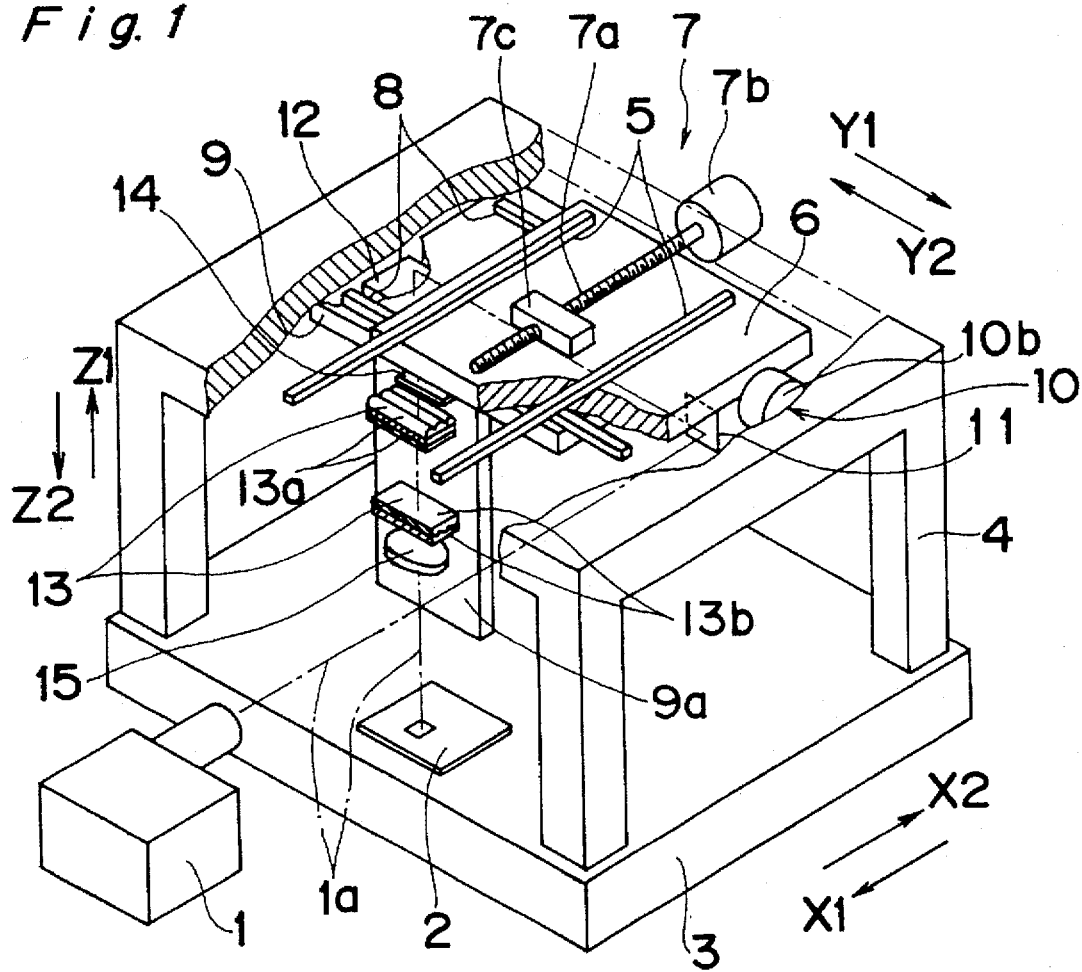

LASER CASTING APPARATUS AND METHOD

BACKGROUND OF THE INVENTION

The present invention relates to a laser casting apparatus and method which casts laser light emitted from a laser light source after decomposing the light into beams each having a small area and superposing the beams to obtain a desired shape of the beam. More specifically, the present invention relates to a laser casting apparatus and method suitably applicable to the case where a relatively large area of a work is to be laser-processed by the relative movement of a laser casting optical system and the work.

A multi-shot laser casting apparatus has been a target for active research and development. In the multishot laser casting apparatus, for instance, an excimer laser light is decomposed into a plurality of beams each having a small sectional area, which are then superposed to obtain a beam of a predetermined shape. The beam is condensed to a predetermined size before scanning, so that a work of a large area is processed by the condensed beam. The multi-shot laser casting apparatus with the above construction is employed, e.g., when the crystal state of a work of crystalline material is to be changed.

A conventional laser casting apparatus of a multi-shot type will be described with reference to FIG. 4.

In FIG. 4, laser light 21a is emitted continuously from a laser light source 21. For example, an excimer laser light 21a is generated with a constant frequency, i.e., several hundreds Hz and with a constant output. The laser light 21a is scanned in the X direction on a work 22 when shifted by a first optical member 31 in the X direction. The first optical member 31 is provided on a first stage 26 moved at a constant speed in the X direction by a first driving means 27. The laser light 21a is also scanned in the Y direction on the work 22 as the laser light 21a is shifted by a second optical member 32 in the Y direction. The member 32 is set on a second stage 29 moved at a constant speed by a second driving means 32 in the Y direction. Accordingly, a predetermined portion of the work 22 of even a large area can be processed by the laser light 21a.

At this time, the laser light 21a is directed onto the work 22 because the optical path of the laser light 21a is bent in the Y2 direction by the first optical member 31, and bent in the Z2 direction by the second optical member 32. A beam forming means 33 is provided in the optical path of the laser light 21a bent in the Z2 direction and directed onto the work 22. The beam forming means 33 forms a beam of the laser light 21a having a predetermined shape by decomposing the light into a plurality of beams each having a small sectional area and superposing the beams. Since the beam forming means 33 superposes a strong part of the laser light 21a which has a large intensity of energy on a weak part of the laser light 21a where the energy intensity is small, the beam forming means 33 attains a uniform energy intensity over all of the section of the beam. The beam forming means 33, consisting of optical members such as cylindrical lenses or the like, divides the laser light 21a from the laser light source 21 in both the longitudinal and the lateral directions, namely, in the X and Y directions, to thereby shape the beam in a predetermined form after superposing the divided beams. For example, supposing that the laser light 21a when emitted from the laser light source 21 is a rectangle at the emitting opening of the laser light source 21, each side being several cm, the beam forming means 33 changes the laser light to a small section, 1×1 cm, on the work 22. Moreover, a beam size-varying means 34 changes the beam obtained by the beam forming means 33 into a predetermined size and casts it onto the work 22.

Since the laser light 21a generated from the laser light source 21 is coherent with a uniform phase, interferences are considerably easily given rise to in the laser light 21a. The laser light 21a passing the beam forming means 33 interferes with one another as if it were transmitted through a slit, increasing or decreasing the intensity. This interference is brought about both in the X direction and in the Y direction, resulting in the formation of interference fringes showing peak values every constant interval. Therefore, even when the intensity distribution of the laser light 21a is uniform as a whole, it is found in minute detail, as shown in FIG. 2, as having peak values every constant interval. The grating never disappears even if the laser light 21a is changed to a predetermined size by the varying means. As a result, not laser light 21a of a uniform intensity distribution, but laser light 21a having peak values every constant interval both in the X direction and in the Y direction, is eventually cast onto the work 22. The crystal state of the work 22 is consequently undesirably varied.

SUMMARY OF THE INVENTION

The object of the present invention is therefore to provide a laser casting apparatus and method capable of casting laser light while maintaining a uniform intensity of the energy of the light even after the light is changed to a predetermined shape and a predetermined size.

In accomplishing these and other objects, according to one aspect of the present invention, there is provided a laser casting apparatus comprising a laser light source, a phase disturbing means for disturbing a phase of laser light output from the laser light source, and a beam forming means for forming a beam of a predetermined shape to cast the formed beam on a work after decomposing the laser light into beams each having a small area and superposing the decomposed beams.

According to another aspect of the present invention, there is provided a laser casting method comprising the steps of emitting laser light from a laser light source, disturbing a phase of the laser light, decomposing the disturbed laser light into beams each having a small area, superposing the decomposed beams and then forming a beam of a predetermined shape, and casting the formed beam on a work.

BRIEF DESCRIPTION OF THE DRAWINGS

These and other objects and features of the present invention will become clear from the following description taken in conjunction with the preferred embodiments thereof and with reference to the accompanying drawings, in which:

FIG. 1 is a perspective view of a laser casting apparatus in a first embodiment of the present invention;

FIG. 2 is a characteristic diagram of the energy intensity of laser light passing through a beam forming means;

DETAILED DESCRIPTION OF THE PREFERRED EMBODIMENTS

Figure 3:
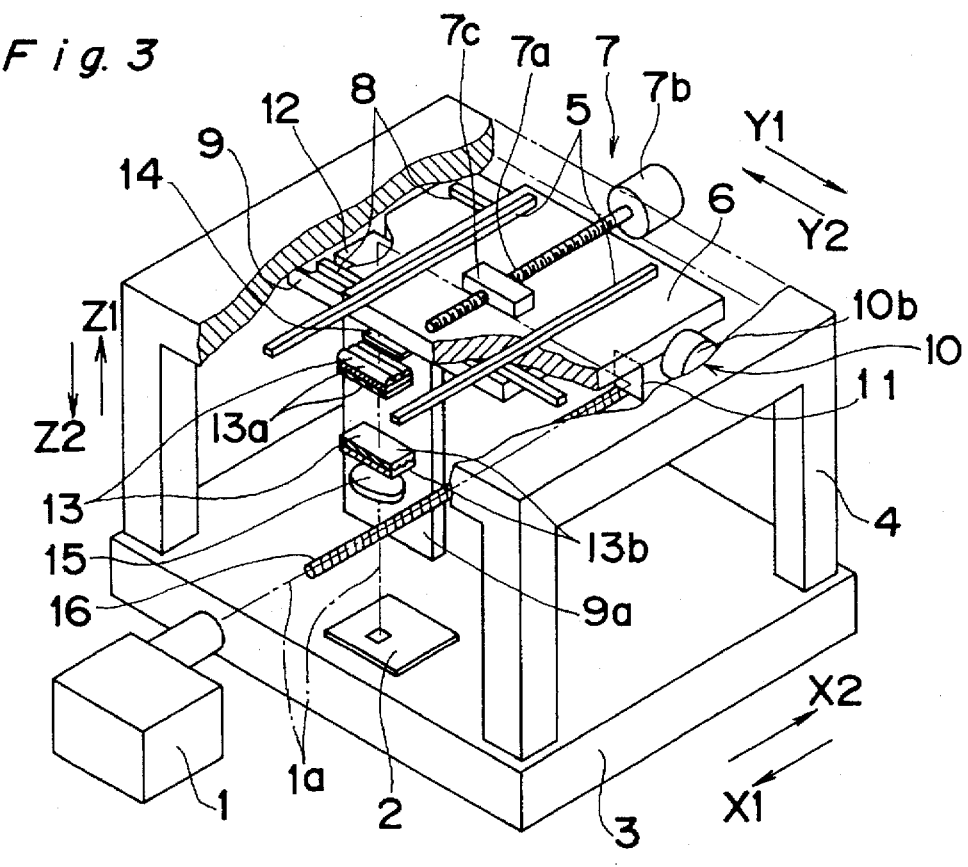
FIG. 3 is a perspective view of a laser casting apparatus in a second embodiment of the present invention.
Figure 4:
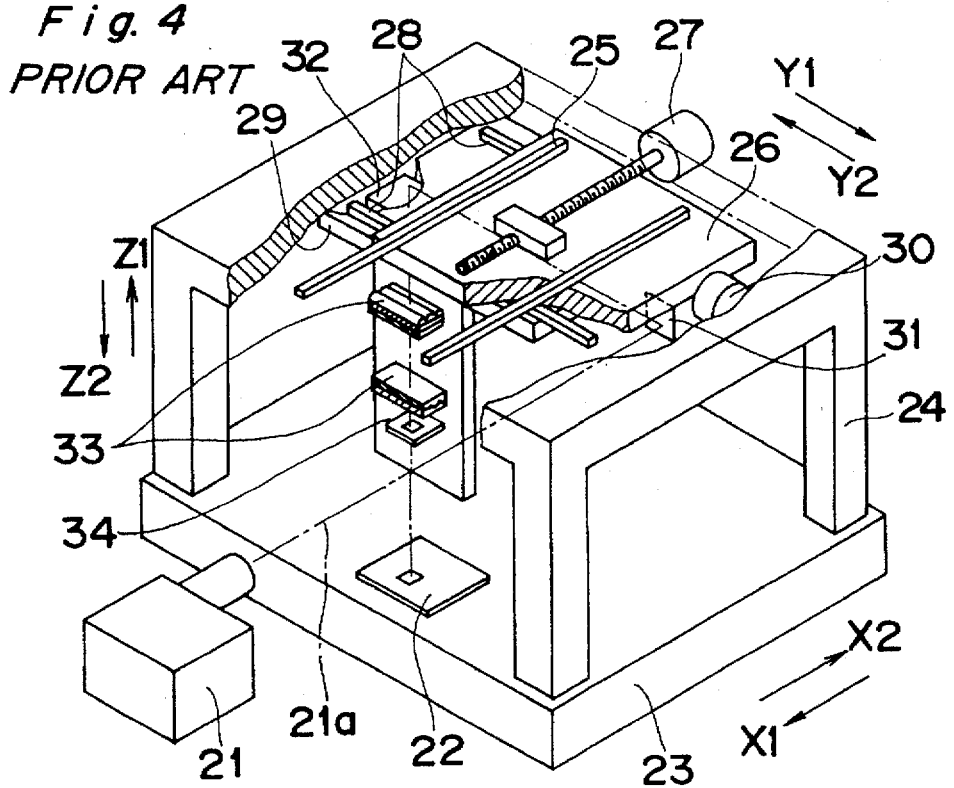
FIG. 4 is a perspective view of a conventional laser casting apparatus.

Before the description of the present invention proceeds, it is to be note d that like parts are designated by like reference numerals throughout the accompanying drawings.

A first embodiment of the present invention will be depicted with reference to FIG. 1.

In FIG. 1, a laser light source 1 emitting laser light 1a is placed at a predetermined position, casting the laser light 1a onto the upper surface of a work 2 fixed on a fixed bed 3. As the cast laser light 1a is scanned, the work 2 is processed. In order to scan the laser light 1a, a frame 4 is set on the fixed bed 3, and a first stage 6 is supported in a manner to be reciprocated in X1, X2 directions by first guide rails 5 which are mounted to the frame 4 and extend in the X1, X2 directions. Moreover, a second stage 9 is provided which is supported in a manner to be reciprocated in Y1, Y2 directions by second guide rails 8. The second guide rails 8 extend in the Y1, Y2 directions on the first stage 6. A first optical member 11 is mounted to the first stage 6 to bend the laser light 1a from the laser light source 1 in the Y2 direction. A second optical member 12 secured to the second stage 9 bends the laser light 1a from the first optical member 11 in a Z2 direction. In this structure, the laser light 1a from the laser light source 1 is cast to the upper surface of the work 2.

At this time, since the first optical member 11 is, together with the first stage 6, moved in the X1, X2 directions by a first driving means 7, the laser light 1a bent to the Y2 direction is shifted in the X1, X2 directions. The first driving means 7 includes a ball screw 7a, a motor 7b mounted to the frame 4 reversibly rotating the ball screw 7a, and a nut 7c mounted to the first stage 6 moved in the X1 and X2 directions by the reversible rotation of the ball screw 7a. Accordingly, the laser light 1a scans the upper surface of the work 2 in the X1, X2 directions on the other hand, when the second optical member 12 is moved in the Y1, Y2 directions along with the second stage 9 by a second driving means 10, the laser light 1a bent in a Z2 direction is shifted in the Y1, Y2 directions, whereby the laser light 1a scans the upper surface of the work 2 in the Y1, Y2 directions. The second driving means 12 has the same construction as the first driving means 11, i.e. it includes a ball screw (not shown), a motor 10b mounted to the frame 4 reversibly rotating the ball screw, and a nut (not shown) mounted to the second stage 9 moved in the Y1 and Y2 directions by the reversible rotation of the ball screw. Because of the scanning by the laser light 1a in two directions, namely, in the X and Y directions, every part of the upper surface of the work 2 is processed by the laser light 1a. For instance, it becomes possible to process a predetermined part on the upper surface of the work 2 to change the crystal state by casting the laser light 1a to the part.

An excimer laser is used for the above processing of the work 2 in one example. The laser light 1a is continuously emitted with several 100 Hz frequency from the laser light source 1. After the laser 1a light is decomposed into beams each having a small sectional area, the beams are superposed and changed to a beam having a required shape and a required size. Then, the scanning beam with the required shape and size is cast onto the upper surface of the work 2. In this case, although the shape and size of the laser light 1a is, for example, several centimeters square in cross section at an emitting opening of the laser light source 1 immediately after being emitted from the laser light source 1, the shape and size of the laser light 1a is changed to 1 cm square at the upper surface of the work 2 owing to the presence of a beam forming means 13 set in the optical path of the laser light 1a bent in the Z2 direction. In order for the beam forming means 13 to separate the laser light 1a into beams each having a small sectional area, two optical members 13a, 13b of the beam forming means 13, each separating the laser light 1a into beams in one direction, are arranged shifted 90° about the optical axis of the beam forming means 13. Further, in order to condense and superpose the laser light 1a to a predetermined sectional shape, the beam forming means 13 uses, for example, two cylindrical lenses 13b, 13b shifted 90° about the optical axis of the beam forming means 13 and condensing the laser light 1a in one direction. The laser light 1a changed to the predetermined sectional shape, after passing the beam forming means 13, is changed in size, but not in shape, by a beam size-varying means 15 and then cast to the upper surface of the work 2. The optical system for casting the laser light 1a, the method for forming the laser light 1a, the method for varying the size of the laser light 1a and the scanning method may be modified in many ways.

The distribution of the energy intensity of the laser light 1a cast to the upper surface of the work 2 through the beam forming means 13 is highly uniform as a whole. However, since the laser light 1a interferes with itself when passing through the beam forming means 13, the intensity of light is increased or decreased if seen microscopically, thereby causing interferences in the X and Y directions, and forming interference fringes showing peak values of the energy intensity at every fixed interval. This state is shown in FIG. 2. That is, since the laser light 1a is originally a coherent light with the uniform phase, the laser light 1a interferes, for example, when passing through a slit. In this embodiment, the beam forming means 13 serves as the slit, and thus the intensity distribution at this time is as in FIG. 2.

When the laser light 1a of the distribution of the energy intensity as represented in FIG. 2 is cast to process the work 2, the work 2 cannot be processed uniformly. Thus, the degree of change of the crystal state of the processed work 2 is varied for each part of the work 2, which cannot be handled well due to the initial difference or irregularity, even if the work 2 is reprocessed.

As such, a filter 14 is disposed to disturb the phase of the laser light 1a between the work 2 and the beam forming means 13 in the embodiment. The filter 14, the beam forming means 113, and the beam size-varying means 15 are fixed to a bracket 9a fixed to the second stage 9. "Random Face Filter" (trade name) manufactured by Showa optical Co., Ltd. or the like is suitable for the filter 14. The interference is eliminated by disturbing the phase of the laser light 1a by means of the filter 14, so that the work 2 is uniformly processed by the laser light 1a representing the uniform distribution of the energy intensity.

A laser casting apparatus in a second embodiment of the present invention will be described with reference to FIG. 3.

According to the second embodiment, in order to heighten the effect of the first embodiment, that is, in order to further disturb the phase of the laser light 1a, an optical fiber 16 is arranged before entering the filter 14. That is, for example, in FIG. 3, the optical fiber 16 is arranged between the laser light source, and the first optical member 11. When the laser light 1a enters the optical fiber 16, the phase of the laser light 1a is disturbed when passing through the optical fiber 16 while reflected in the optical fiber 16. Accordingly, the laser light 1a shows more uniform distribution of the energy intensity with no interference, thus making it possible to process the work 2 uniformly.

As is clear from the foregoing description of the present invention, since the laser light is decomposed into beams each having a predetermined shape, and then the decomposed beams are superposed to form a beam having a predetermined shape, the energy distribution of the laser light becomes uniform. Moreover, since the phase of the laser light output from the laser light source is disturbed, interference fringes are not generated even when the beams are superposed. Accordingly, the apparatus can attain a beam of uniform distribution of energy even in a microscopic view.

Since the thus-obtained beam is changed to a required size when cast to the work and the work is moved relatively to the casting optical system, a relatively large part of the work can be processed in a desired manner.

The employment of the filter or optical fiber enables easy and inexpensive disturbance of the phase of the laser light at random without forming interference fringes. If both means are provided, a larger effect can be achieved.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A laser casting apparatus, comprising:

a laser light source for outputting laser light;

a beam forming means for decomposing the laser light from said laser light source into decomposed beams each having a predetermined shape and superposing the decomposed beams so as to form a superposed beam of laser light having a predetermined shape and a uniform energy distribution for casting on a work; and a phase disturbing means for disturbing the phase of the laser light output from said laser light source so that when said beam forming means superposes the decomposed beams and forms the superposed beam of laser light having a predetermined shape and a uniform energy distribution the generation of interference fringes in the energy intensity distribution of the laser light is avoided.

2. The apparatus of claim 1, wherein said phase disturbing means comprises a filter.

3. The apparatus of claim 1, wherein said phase disturbing means comprises an optical fiber.

4. The apparatus of claim 1, wherein said phase disturbing means comprises an optical fiber and a filter.

5. The apparatus of claim 1, and further comprising a beam size varying means for varying the size of the superposed beam.

6. The apparatus of claim 1, and further comprising a laser light scanning means for relatively moving the superposed beam of laser light across the work in X and Y directions of the work.

7. The apparatus of claim 2, and further comprising a laser light scanning means for relatively moving the superposed beam of laser light across the work in X and Y directions of the work.

8. The apparatus of claim 3, and further comprising a laser light scanning means for relatively moving the superposed beam of laser light across the work in X and Y directions of the work.

9. The apparatus of claim 4, and further comprising a laser light scanning means for relatively moving the superposed beam of laser light across the work in X and Y directions of the work.

10. The apparatus of claim 5, and further comprising a laser light scanning means for relatively moving the superposed beam of laser light across the work in X and Y directions of the work.

11. A method of casting laser light comprising the steps of:

emitting a laser light from a laser light source;

decomposing the laser light from the laser light source into decomposed beams each having a predetermined shape;

superposing the decomposed beams so as to form a superposed beam of laser light having a predetermined shape and a uniform energy distribution;

casting the superposed beam of laser light on a work; and disturbing the phase of the laser light output from the laser light source so that when the decomposed beams are superposed and form the superposed beam of laser light having a predetermined shape and a uniform energy distribution, the generation of interference fringes in the energy intensity distribution of the laser light is avoided.

12. The method of claim 11, wherein said step of disturbing comprises disturbing the phase of the laser light with a filter.

13. The method of claim 11, wherein said step of disturbing comprises disturbing the phase of the laser light with an optical fiber.

14. The method of claim 11, wherein said step of disturbing comprises disturbing the phase of the laser light with a filter and an optical fiber.

15. The method of claim 11, and further comprising a step of varying the size of the superposed beam carried out before said step of casting.

16. The method of claim 11, wherein said step of casting comprises scanning the superposed beam across the work by moving the superposed beam of light relative to the work in X and Y directions of the work.

17. The method of claim 12, wherein said step of casting comprises scanning the superposed beam across the work by moving the superposed beam of light relative to the work in X and Y directions of the work.

18. The method of claim 13, wherein said step of casting comprises scanning the superposed beam across the work by moving the superposed beam of light relative to the work in X and Y directions of the work.

19. The method of claim 14, wherein said step of casting comprises scanning the superposed beam across the work by moving the superposed beam of light relative to the work in X and Y directions of the work.

20. The method of claim 15, wherein said step of casting comprises scanning the superposed beam across the work by moving the superposed beam of light relative to the work in X and Y directions of the work.

* * * * *